United States Patent [19]

Crispell

[11] 4,229,875
[45] Oct. 28, 1980

[54] METHOD OF PRESTRESSING BOLTS

[75] Inventor: Corey F. Crispell, Warminster, Pa.

[73] Assignee: SPS Technologies, Inc., Jenkintown, Pa.

[21] Appl. No.: 973,477

[22] Filed: Dec. 26, 1978

[51] Int. Cl.³ .......................... B21K 1/46; B21D 31/00
[52] U.S. Cl. ........................................ 29/452; 10/27 R
[58] Field of Search ............... 29/452; 10/10 R, 27 R; 72/378; 85/1 T

[56] References Cited
U.S. PATENT DOCUMENTS

| 2,060,593 | 11/1936 | Schaurte et al. | 85/1 T |
| 2,341,469 | 2/1944 | Newall | 10/27 R |
| 4,023,225 | 5/1977 | Tochilkin et al. | 10/27 R |
| 4,035,858 | 7/1977 | Dahl | 10/27 H |

FOREIGN PATENT DOCUMENTS

| 442984 | 2/1936 | United Kingdom | 10/27 R |
| 1321845 | 7/1973 | United Kingdom | 72/378 |

*Primary Examiner*—Ervin M. Combs
*Attorney, Agent, or Firm*—Aaron Nerenberg

[57] ABSTRACT

A fatigue resistant bolt, and method for making same, is disclosed. Bolts which are tightened to very high loads and are subjected to a dynamic environment are particularly subject to fatigue failure. It has been found that a bolt with fatigue resistant properties may be manufactured if its threads are formed while it is subjected to its design load. In another embodiment of the invention it has been found that the fatigue properties of the fillet at the bolt head and shank juncture may be significantly increased if the fillet is cold worked while the bolt is subjected to its design load.

18 Claims, 4 Drawing Figures

METHOD OF PRESTRESSING BOLTS

BACKGROUND OF THE INVENTION

1. Field of the Invention

This invention relates to fatigue resistant fasteners, in general and fatigue resistant bolts in particular.

It is well known that structural members, including bolts, are more subject to structural failure when they are cyclically or dynamically stressed. This is particularly true with respect to bolts which have a high static design load or preload. When such bolts are tightened to their design preload and then subjected to a dynamic environment they may experience dynamic stresses than approach and even exceed the yield strength of the material from which the bolt is manufactured. This can, of course, result in structural failure.

One solution to this problem is to simply use a larger bolt. However, in may instances this is not practical or desirable. For example, in aircraft applications an undesirable weight penalty would be experienced.

2. Description of the Prior Art

Experience has shown that fatigue failure of such bolts usually occurs in the threads. Accordingly, efforts to produce fatigue resistant bolts have been concentrated on thread design. An example of a bolt having fatigue resistant threads is taught in U.S. Pat. No. 3,433,117 issued to Gowen, et al, on Mar. 18, 1969. In this invention the fatigue resistant properites of the bolt were obtained through certain modifications as to the form and relative arrangement of the threads.

SUMMARY OF THE INVENTION

The present invention provides a bolt having superior fatigue characteristics when it is subjected to dynamic loading. Under such dynamic loading the bolt can experience much higher stresses in the thread area, than would otherwise be expected. It has been found that if the bolt is placed in tension while the threads are being formed, the resultant bolt will have superior fatigue characteristics in that the threads will have a higher fatigue endurance strength. The bolt should be placed in tension at a load equal to the design load of the particular bolt being manufactured. The threads should be formed, preferably, by rolling. Of course, after the threads have been formed and the preload is removed, the resultant threads are prestressed.

In other embodiments of the invention some or all of the bolt threads of a conventional bolt are cold worked or rerolled while the bolt is placed in tension. It has also been discovered that the fatigue properties of the fillet located at the juncture of the bolt head and shank may be increased by cold working it while the bolt is placed in tension.

Accordingly, it is an object of the present invention to provide a fastener having improved fatigue characteristics.

It is an object of the present invention to provide a bolt having improved fatigue characteristics.

It is another object of the present invention to provide a bolt having an increased ultimate endurance limit or fatigue strength in the thread area.

Still another object of the present invention is to provide a bolt having an increased ultimate fatigue strength or endurance limit in the fillet region at the head shank juncture.

It is still another object of the present invention to provide a bolt having threads formed therein while the bolt is placed in tension.

It is a further object of the present invention to provide a bolt having conventional threads which are cold worked while the bolt is placed in tension.

Other objects and a fuller understanding of the invention will be had by reference to the following description and claims of the preferred embodiment thereof taken in conjunction with the accompanying drawings wherein like reference characters refer to like or similar parts throughout.

DESCRIPTION OF THE PREFERRED EMBODIMENTS

Figure 1:
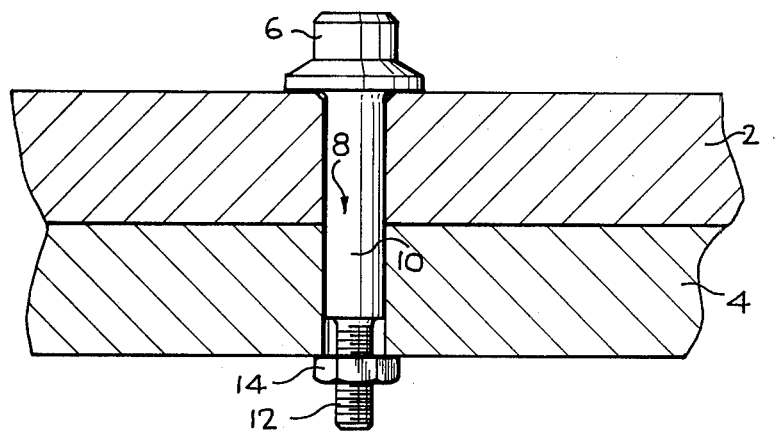
FIG. 1 shows a side view of two workpieces, broken away, being secured to one another by the bolt of the present invention.

Referring now to FIG. 1, where workpieces 2 and 4 are secured by a bolt of the present invention. The bolt includes a head 6 connected to a shank 8. The shank 8 may include an unthreaded portion or grip length 10 and a threaded portion 12. The bolt is shown threadably engaged with a nut 14. Typically, bolts of the type herein discussed are designed to be tightened or torqued to a particular static load or force F. Of course, the particular value of the force F is determined by the application for which the particular bolt is being designed.

As has previously been mentioned, when such bolts are placed in a fatigue environment by cyclically or dynamically varying the load on the workpieces 2 and 4 and hence problems with bolt failure in the thread area 12 arise.

It has been found that the ultimate endurance limit or ultimate fatigue strength of the threads 12 may be increased when the bolt is manufactured according to the method of the present invention. The increase in ultimate fatigue strength of the threads 12 is achieved when they are formed while the shank 8 is placed in tension. It is preferable that the tension be equal to the design load F of the bolt.

Figure 2:
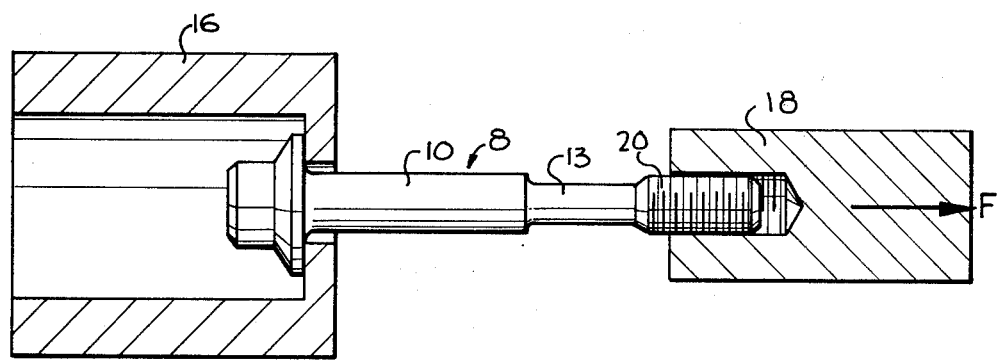
FIG. 2 shows a bolt of the present invention being placed in tension prior to the threads being formed therein.

Referring now to FIG. 2 where there is shown a bolt of the present invention prior to the threads 12 being formed therein. The shank 8 is shown with its grip length 10, an unthreaded region 13 and a threaded portion 20. The threaded portion 20 has threads formed therein by any conventional method. The region 13 is where the threads 12 will be formed.

In forming the threads 12 in region 13 the bolt is placed in a support bushing 16 after which the threads 20 are engaged in a threaded adapter 18. A force F is then applied either to the bushing 16 or the adapter 18 so as to place the bolt in tension F. While the bolt is being subjected to force F the threads 12 are formed in region 13. The threads may be formed by rolling or machining, although rolling is used in the preferred embodiment of the invention.

Figure 3:
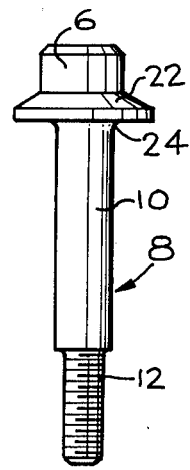
FIG. 3 shows a bolt of the present invention.

After the threads 12 have been formed in region 13 the force F is released thus permitting the threads 12 to become prestressed. Then the adapter 18 is removed from threads 20 and the bolt is removed from the bushing 16. The threaded region 20 is then cut off or removed and the remaining portion of the bolt is finished and pointed to length, as is shown in FIG. 3.

In another embodiment of the invention a similar result may be achieved by starting with a bolt having threads formed in a conventional manner. Such a bolt is placed in the bushing 16 and a portion of its threads are engaged in the adapter 18. A force F equal to the design load of that bolt is then applied. Instead of forming the threads 12 while the bolt is being subjected to the tension F a portion of the threads 12 which are not engaged in the adapter 18 are rerolled or cold worked. The force F is then released and the bolt is removed from the bushing 16 and the adapter 18. If desired, those threads which have not been rerolled may be cut off or removed and the bolt pointed to a new length. In a slightly different version of this embodiment, only a few top threads are rerolled or cold worked. This will achieve desirable results as it is the top threads which are most subjected to fatigue loads.

It is common in the art to which the present invention pertains, to cold work the fillet, by rolling, at the head shank juncture of conventional bolts. This is generally accomplished by exerting a downward force on the bolt head while rotating the bolt so that the fillet region is cold worked by rollers.

Figure 4:
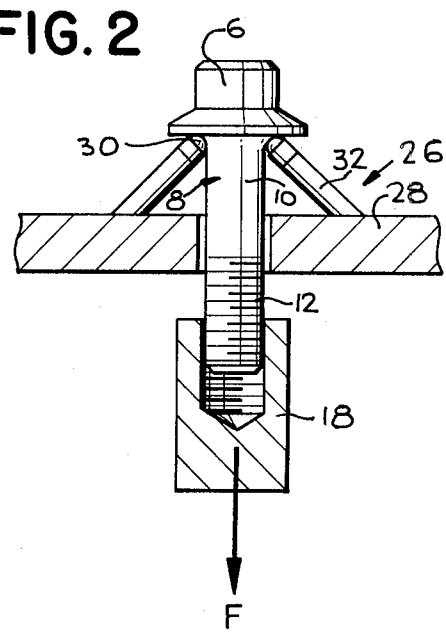
FIG. 4 shows a bolt of the present invention and apparatus for cold working a fillet thereof while the bolt is placed in tension.

In a third embodiment of the present invention the fillet 24 at the juncture of the flange 22 of the head 6 and the shank 8, as shown in FIG. 4, is cold worked while the bolt is placed in tension. The bolt is placed in a holder 26. The holder 26 has a base 28 and fillet rollers 30 which are connected to the base 28 by arms 32. The threads 12 are engaged in the adapter 18. The force F is then applied and the adapter is rotated causing the fillet 24 to roll over the rollers 30 causing it to be cold worked. Subsequent to the cold working the force F is released and the bolt is removed from the adapter 18 and the holder 26. In this manner the fatigue strength of the fillet is increased.

It has been found that, in some instances, if a bolt having threads formed therein according to the present invention is used at a very high preload, the bolt may fail at the head shank juncture. Accordingly, in such situations it is desirable to cold work the fillet region formed at the head shank juncture, in such bolts, thus raising the fatigue endurance strength of that region. This will reduce the likelihood of failure at the head shank juncture and thus increase the fatigue endurance strength of the bolt thread and fillet areas.

The thread forming and fillet cold working methods of the present invention increases the fatigue endurance strength of the respective regions of the bolt. As is well known to those skilled in the art, this necessarily increases the fatigue cycle life or number of cycles where failure occurs.

In conventional methods of forming threads on a bolt shank, e.g. rolling or machining, compressive stresses in the thread area are induced. This in and of itself serves to increase the fatigue characteristics of the thread region. It is for this reason that conventional bolts which are designed for a dynamic environment have threads which are formed after heat treatment, as the heat treatment reduces or eliminates the induced compressive stresses generated by a thread forming process. Accordingly, it is contemplated that the methods of the present invention will be applied to bolts only after they have undergone heat treatment.

While in the foregoing specification and drawings there have been disclosed various embodiments of a fastener in accordance with the present invention, various changes and modifications should be readily apparent to one skilled in the art and are within the intended scope of the invention as recited in the appended claims.

I claim:

1. The method of forming threads in the shank of a bolt which comprises:
    exerting a force on the shank of the bolt placing it in tension;
    forming the threads in the shank while it is in tension; and
    releasing the force after the threads have been formed; whereby prestressed threads are provided.

2. The method of claim 1 wherein the tension is substantially equal to the design load of the bolt.

3. The method of claim 1 wherein said threads are formed by rolling.

4. The method of claim 1 wherein said threads are formed by machining.

5. The method of claim 3 or 4 wherein said tension is substantially equal to the design load of the bolt.

6. The method of cold working threads in the shank of a bolt which comprises:
    exerting a force on the shank of the bolt placing it in tension;
    cold working the threads by rerolling them while the shank is in tension; and
    releasing the force after the threads have been cold worked; whereby prestressed threads are provided.

7. The method of claim 6 wherein the force is substantially equal to the design load of the bolt.

8. The method of claims 1 or 6 wherein the bolt includes a fillet at the juncture of the head and shank, and which further includes the step of cold working the fillet while the bolt is in tension.

9. The method of claim 8 wherein said tension is substantially equal to the design load of the bolt.

10. The method of claim 9 wherein said fillet is cold worked by rolling.

11. The method of claim 10 wherein said tension is substantially equal to the design load of the bolt.

12. The method of cold working a fillet which is formed at the juncture of the head and shank of a bolt which comprises:
    exerting a force on the shank of the bolt placing it in tension;
    cold rolling the fillet while the bolt is in tension; and
    releasing the force after the fillet has been cold rolled, whereby a prestressed fillet is provided.

13. The method of claim 12 wherein said tension is substantially equal to the design load of the bolt.

14. The method of forming prestressed threads in a bolt, having a head and an unthreaded shank, which comprises:
    forming first threads in the end of the shank;
    placing the bolt in a head supporting means;
    engaging the first threads with mating threads of an adapter;
    exerting a force between the adapter and the head supporting means to place the bolt in tension;
    forming secured threads in the shank, adjacent the first threads, while the bolt is in tension;

releasing the tension force after the second threads have been formed;
disengaging the first threads from the adapter;
removing the bolt from the head supporting means;
removing that portion of the shank in which the first threads were formed; and
pointing the bolt shank.

15. The method of claim 14 wherein the force is substantially equal to the design load of the bolt.
16. The method of claim 14 wherein the second threads are formed by rolling.
17. The method of claim 14 wherein the second threads are formed by machining.
18. The method of claim 16 or 17 wherein the force is substantially equal to the design load of the bolt.

* * * * *